United States Patent [19]

Katada et al.

[11] 3,949,423
[45] Apr. 6, 1976

[54] CASSETTE LOCATING AND HOLDING DEVICES IN A CASSETTE TAPE RECORDING AND/OR REPRODUCING APPARATUS

[75] Inventors: Hiromitsu Katada; Yoshikazu Ishimatsu, both of Yokohama, Japan

[73] Assignee: Sony Corporation, Tokyo, Japan

[22] Filed: Oct. 11, 1974

[21] Appl. No.: 514,235

[30] Foreign Application Priority Data
Oct. 31, 1973   Japan.................. 48-126342[U]

[52] U.S. Cl. .............................. 360/96; 360/105
[51] Int. Cl.² .................. G11B 5/54; G11B 21/22
[58] Field of Search .......................... 360/105, 96

[56] References Cited
UNITED STATES PATENTS

| | | | |
|---|---|---|---|
| 3,609,844 | 10/1971 | Ichikawa | 360/105 |
| 3,684,295 | 8/1972 | Strain | 360/105 |
| 3,768,814 | 10/1973 | Sato | 360/105 |
| 3,877,073 | 4/1975 | Takashino | 360/105 |

*Primary Examiner*—Robert S. Tupper
*Attorney, Agent, or Firm*—Lewis H. Eslinger; Alvin Sinderbrand

[57] ABSTRACT

A cassette tape recording and/or reproducing apparatus having support members fixed on a chassis and engageable from above by a tape cassette for supporting and locating the latter in an operative position in respect to a head or heads mounted on a carriage which is movable relative to the chassis between an inactive position in which each head is spaced from the operatively positioned cassette, and an active position in which each head is adapted to engage the tape in the cassette; is provided with holding members which are pivotally or slidably mounted on the chassis itself for movement with respect to the latter between cassette holding positions, in which they engage from above with an operatively positioned cassette for securely holding the latter against the support members without stressing the carriage or its movable mounting on the chassis in the direction that would affect the level of the head or heads in respect to the tape in the cassette, and cassette releasing positions, in which the holding members are spaced from the cassette so as to avoid interference with the movement of the cassette to and from its operative position on the support members. The holding members are actuated so as to be moved to their cassette holding and releasing positions upon movement of the carriage to its active and inactive positions, respectively. Such actuation of the holding members is achieved either by cooperatively engageable actuating members on the holding members and carriage, respectively, or by actuating connections between the holding members and a control mechanism by which the carriage is selectively moved between its active and inactive positions.

7 Claims, 12 Drawing Figures

FIG.12

CASSETTE LOCATING AND HOLDING DEVICES IN A CASSETTE TAPE RECORDING AND/OR REPRODUCING APPARATUS

BACKGROUND OF THE INVENTION

1. Field of the Invention

This invention relates generally to cassette tape recording and/or reproducing apparatus, and more particularly is directed to improvements in the devices provided in such apparatus for locating a tape cassette in respect to the head or heads by which signal recording and/or reproducing operations are performed.

2. Description of the Prior Art

It has been proposed, for example, in U.S. Pat. No. 3,743,299, issued July 3, 1973, and having a common assignee herewith, to provide a cassette tape recording and/or reproducing apparatus with a plurality of support members fixed on the chassis and having shouldered portions adapted to receive and support an edge portion of the cassette at a predetermined level in respect to the chassis, and a head supporting carriage which is slidably mounted on the chassis, for example, by pin and slot connections therebetween, for movement of the carriage relative to the chassis between an inactive position, in which each head on the carriage is spaced from a cassette operatively positioned on the support members, and an active position, in which each head is adapted to extend into a respective opening or window in the previously mentioned edge portion of the operatively positioned cassette for engagement with the tape in the latter. In order to maintain the positioning engagement of the mentioned shouldered portions of the support members with the edge portion of the cassette, particularly when the apparatus is portable so as to be subject to movement during recording and/or reproducing operations, the previously proposed apparatus has hold-down members or arms which are mounted on the head carriage. In the inactive position of the carriage, such hold-down members are spaced from the cassette so as to avoid interference with movement of the latter toward and away from its operative position on the support members. However, when the carriage is moved to its active position, the hold-down members move therewith to project over the edge portion of the operatively positioned cassette and to bear resiliently downward on the latter for maintaining the desired positioning engagement thereof with the support members. Since the hold-down members are mounted on the carriage, their downward resilient bearing on the cassette has an upward reaction on the carriage by which the latter may be upwardly deflected to vary the level of the head or heads thereon in respect to the tape in the operatively positioned cassette.

Further, in the previously proposed arrangement for locating the cassette, a resilient member acts against the edge portion of the operatively positioned cassette which is opposite the edge portion thereof seated on the shouldered portions of the support members or blocks so as to urge the seated edge portion against upstanding surfaces of such shouldered portions with a view to accurately and uniformly establishing the contact pressure of a head on the carriage against the tape in the operatively positioned cassette. However, if the hold-down members are allowed to bear down on the cassette during movement of the carriage to its active position, the frictional engagement of the hold-down members with the cassette tends to move the latter away from the upstanding surfaces of the shouldered portions with the result that the mentioned contact pressure is varied and the quality of signal recording or reproducing is deteriorated.

SUMMARY OF THE INVENTION

Accordingly, it is an object of this invention to provide an improved arrangement for supporting and locating a tape cassette in a recording and/or reproducing apparatus, and which avoids the above described problems associated with the prior art.

More specifically, it is an object of this invention to provide an arrangement for supporting and locating a tape cassette in a recording and/or reproducing apparatus, and by which the level of the recording and/or reproducing head or heads relative to the tape in the operatively positioned cassette is precisely and reliably determined.

Another object is to provide an arrangement, as aforesaid, for supporting and locating the tape cassette, and by which the contact pressure of the recording and/or reproducing head or heads against the tape in the operatively positioned cassette is also precisely and reliably determined for high quality recording and reproducing of signals on such tape.

In accordance with an aspect of this invention, a cassette tape recording and/or reproducing apparatus having support members fixed on a chassis and engageable from above by a tape cassette for supporting and locating the latter in an operative position in respect to a recording and/or reproducing head or heads mounted on a carriage which is movable relative to the chassis between active and inactive positions, as previously described, is provided with holding means movably mounted on the chassis, rather than on the carriage, for movement with respect to the chassis between between a cassette holding position, in which the holding means engages the operatively positioned cassette from above for urging the cassette against the support members, and a cassette releasing position, in which the holding means is free of the cassette to avoid interference with movement of the cassette to and from its operative position, and such holding means is actuated so as to be disposed in its cassette holding and releasing positions upon movement of the carriage to its active and inactive positions, respectively. By reason of the mounting of the holding means on the chassis, rather than on the head carriage, such holding means can bear resiliently downward on the cassette in its cassette holding position without the danger that the reaction thereto will tend to lift the head carriage relative to the chassis, and thereby disturb the desired relation of the level of the head or heads in respect to the tape in the operatively positioned cassette.

The actuation of the holding means between its cassette holding and releasing positions may be effected by cooperatively engageable actuating elements attached to such holding means and the head carriage, respectively, or by a connection between the holding means and the control mechanism which is conventionally provided for selectively disposing the head carriage in its active and inactive positions.

In particularly desirable embodiments of the invention, the holding means includes a pair of holding members mounted, for example, on respective arms that are pivoted on the chassis, so that, in moving from the cassette releasing position to the cassette holding position, each of the holding members moves frictionally over the upper surface of an operatively positioned cassette along a path having a component directed toward the cassette edge portion which is engageable with the upstanding surfaces of the shouldered portions on the support members, whereby to promote the close and accurate engagement of the cassette with such upstanding surfaces.

The above, and other objects, features and advantages of the invention will be apparent in the following detailed description of illustrative embodiments thereof which is to be read in connection with the accompanying drawings.

DESCRIPTION OF THE PREFERRED EMBODIMENTS

Figure 1:
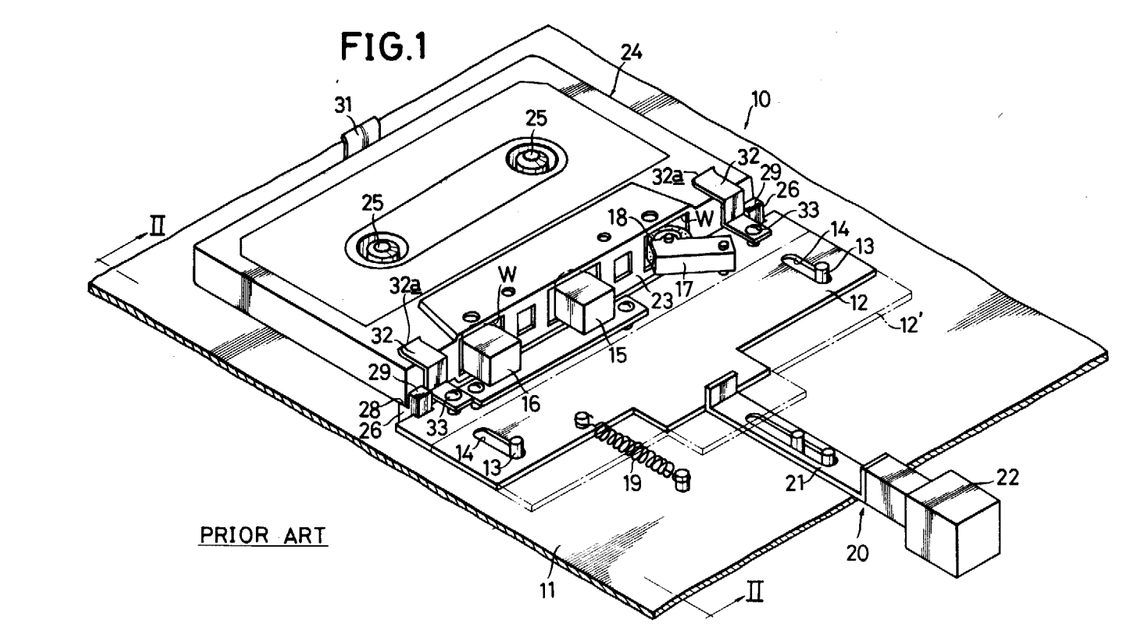
FIG. 1 is a perspective view of a portion of a cassette tape recording and/or reproducing apparatus having a cassette positioning structure according to the prior art.
Figure 2:
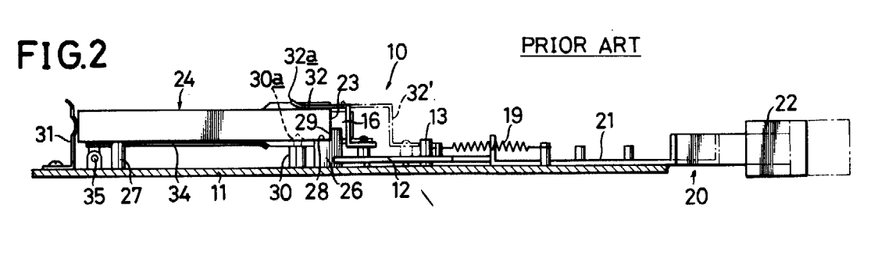
FIG. 2 is a sectional view taken along the line II—II on FIG. 1 for further illustrating the cassette positioning structure of the prior art.

Referring to the drawings in detail, and initially to FIGS. 1 and 2 thereof, it will be seen that a prior art cassette tape recording and/or reproducing apparatus 10 of the type to which this invention relates generally comprises a chassis or base plate 11 on which a carriage 12 is mounted for rectilinear or reciprocal sliding movement, for example, by means of pins 13 projecting from chassis 11 and engaging in elongated slots 14 formed in carriage 12. A magnetic recording and reproducing head 15 and an erasing head 16 are suitably mounted on carriage 12 for movement with the latter, and carriage 12 further carries a pivoted support arm 17 on which a pinch roller 18 is rotatably mounted. By reason of its reciprocal slidable mounting on chassis 11, carriage 12 is movable between an active position, shown in full lines on FIG. 1, and an inactive position indicated in broken lines at 12'. A spring 19 may be connected between chassis 11 and carriage 12 for urging the latter to its inactive position 12', and a conventional control mechanism 20 may be provided for displacing carriage 12 from its inactive position to its active position. Such control mechanism 20, which may be of conventional construction, forms no part of the present invention, and is simply illustrated as including a link 21 which is longitudinally slidable so as to act, at one end, against carriage 12 for moving the latter to its active position when the other end of link 21 is displaced in response to the manual actuation or depression of an associated control push-button 22 for selecting the recording or reproducing mode of operation of apparatus 10. In the active position of carriage 12, heads 15 and 16 and pinch roller 18 are intended to extend into respective windows W conventionally formed in the forward edge portion or wall 23 of an operatively positioned tape cassette 24 for engagement with a run of the magnetic tape guided along the inner surface of edge wall 23 between reels 25 contained in the cassette housing and on which the tape is wound.

In order to support and locate tape cassette 24 in its operative position on chassis 11, the apparatus 10 according to the prior art is shown to include a pair of laterally spaced apart support blocks 26 fixedly mounted on chassis 11 adjacent the location of carriage 12 in its active position, and a support pin 27 (FIG. 2) which is also fixed on chassis 11 and spaced rearwardly from support blocks 26 and laterally centered between such support blocks. Each of support blocks 26 has a shouldered upper portion to define a first surface 28 facing upwardly, that is, away from chassis 11, and a second, upstanding surface 29 which faces rearwardly and extends from the respective surface 28. The upper end surface of pin 27 and upwardly facing surfaces 28 of support blocks 26 lie in a common plane parallel to chassis 11 and are engageable from above by the undersurface of cassette 24 in the operative position of the latter for determining the level of the run of the magnetic tape extending along edge wall 23 of the cassette, particularly in respect to the recording and reproducing head 15 when carriage 12 is in its active position. Further, the engagement of front edge wall 23 of the operatively positioned cassette 24 with upstanding surfaces 29 on support blocks 26 is intended to define the location of cassette 24, in the forward and rearward direction, relative to the active position of carriage 12, and hence to establish the contact pressure of head 15 against the tape in operatively positioned cassette 24 when carriage 12 is in its active position for a recording or reproducing operation of apparatus 10.

In order to laterally locate cassette 24 in its operative position, at least one stud 30 (FIG. 2) is fixedly located on chassis 11 so as to be disposed under the operatively positioned cassette, and each such stud 30 has a tapered or conical head 30a (shown in broken lines on FIG. 2) which is adapted to engage in a respective aperture or socket in the bottom of cassette 24 when the latter is seated on support blocks 26 and pin 27. In order to hold front edge wall 23 of cassette 24 against the upstanding surface 29 on support blocks 26, a resilient arm 31 is secured, at its lower end, on chassis 11 and extends upwardly therefrom so as to bear forwardly against the back edge wall of the operatively positioned cassette 24.

In order to maintain intimate contact between cassette 24 and the upwardly facing surfaces 28 on support blocks 26 during a recording or reproducing operation of apparatus 10, particularly when the latter is portable so that the cassette 24 is likely to be subject to movement during such operation, the illustrated apparatus 10 according to the prior art is shown to include hold-down members 32 which are mounted on head carriage 12 at laterally spaced apart locations. In the inactive position of carriage 12, such hold-down members are spaced from the cassette 24, as indicated in broken lines at 32' on FIG. 2, so as to avoid interference with movement of cassette 24 toward and away from its operative position on support blocks 26 and pin 27. However, when carriage 12 is moved to its active position, hold-down members 32 move therewith to project over the forward edge of the operatively positioned cassette 24 and to bear resiliently downward on the upper surface of the cassette, preferably at locations that are laterally near to support blocks 26, for maintaining the desired positioning engagement of the undersurface of the cassette with surfaces 28 on the support blocks. In the illustrated apparatus according to the prior art, each of the hold-down members 32 is shown to be generally Z-shaped and formed of spring steel or other resilient material with one end of the member being secured, as by a screw 33, to carriage 12, while the opposite, relatively elevated end portion has an upwardly bent end edge 32a. Each such Z-shaped hold-down member 32 is dimensioned so that its rearwardly directed, relatively elevated end portion is yieldably urged to a normal position slightly below the upper surface of cassette 24 when the latter is positioned on support blocks 26. Thus, during the rearward movement of carriage 12 to its active position, the upwardly bent end edge 32a of each hold-down member 32 cams over the top of forward edge wall 23 of the cassette to resiliently flex hold-down member 32, whereby to cause the relatively elevated end portion of the latter to bear resiliently downward on cassette 24 in the active position of carriage 12.

Although the above described arrangement according to the prior art is effective to hold the operatively positioned cassette 24 against surfaces 28 of support blocks 26 when carriage 12 is in its active position, it will be apparent that the mounting of hold-down members 32 on carriage 12 causes the downward resilient bearing of members 32 on cassette 24 to produce an upward reaction on carriage 12. Since there is necessarily some vertical play in the slidable mounting of carriage 12 on chassis 11, such upward reaction on carriage 12 tends to lift the latter relative to chassis 11 and, with repeated use of the apparatus, the mentioned vertical play tends to increase with the result that, although hold-down members 32 maintain intimate engagement of cassette 24 with surfaces 28 on support blocks 26, the desired predetermined relationship of the level of recording and reproducing head 15 in the active position of carriage 12 relative to the tape engaged thereby within cassette 24 is not reliably maintained.

Further, as shown schematically on FIG. 2, the prior art apparatus 10 is provided with an ejecting mechanism which includes a platform 34 disposed horizontally below cassette 24 when the latter is operatively positioned on support blocks 26 and pin 27, and being pivotally mounted, adjacent its rear edge, on chassis 11, as at 35, so that, upon actuation of an ejecting control (not shown), platform 34 is swung upwardly about pivot 35 for similarly tilting cassette 24 and thereby lifting the forward edge portion of the latter from support blocks 26. Therefore, if such ejecting mechanism is inadvertently actuated at a time when carriage 12 is in its active position, hold-down members 32 forcibly resist lifting of the forward edge portion of the cassette and, by reason of the mounting of hold-down members 32 on carriage 12, the resulting force again tends to increase the vertical play in the slidable mounting of carriage 12 on chassis 11.

Finally, in respect to the apparatus 10 according to the prior art, it will be noted that, during the movement of carriage 12 to its active position, hold-down members 32 frictionally engage and move rearwardly on the upper surface of cassette 24 and thus tend to move the latter rearwardly against the forwardly directed force of resilient member 31. Thus, when carriage 12 arrives at its active position, the forward edge wall of cassette 24 may be more or less spaced from upstanding surfaces 29 on support blocks 26 with the result that a predetermined contact pressure of head 15 with the tape in cassette 24 will not be reliably achieved. Consequently, the quality of the recording or reproducing of signals on the tape may be deteriorated.

Generally, in accordance with this invention, the foregoing problems encountered in the described apparatus of the prior art are avoided by replacing the hold-down members 32 mounted on head carriage 12 with holding means movably mounted on the chassis 11 for movement with respect to the latter between a cassette holding position, in which such holding means engages the operatively positioned cassette 24 from above for urging the cassette against surfaces 28 on support blocks 26, and a cassette releasing position, in which the holding means is free of the cassette to avoid interference with movement of the latter to and from its operative position, and by providing actuating means for such holding means operative to move the latter to its cassette holding and releasing positions upon movement of carriage 12 to its active and inactive positions, respectively.

Figure 3:
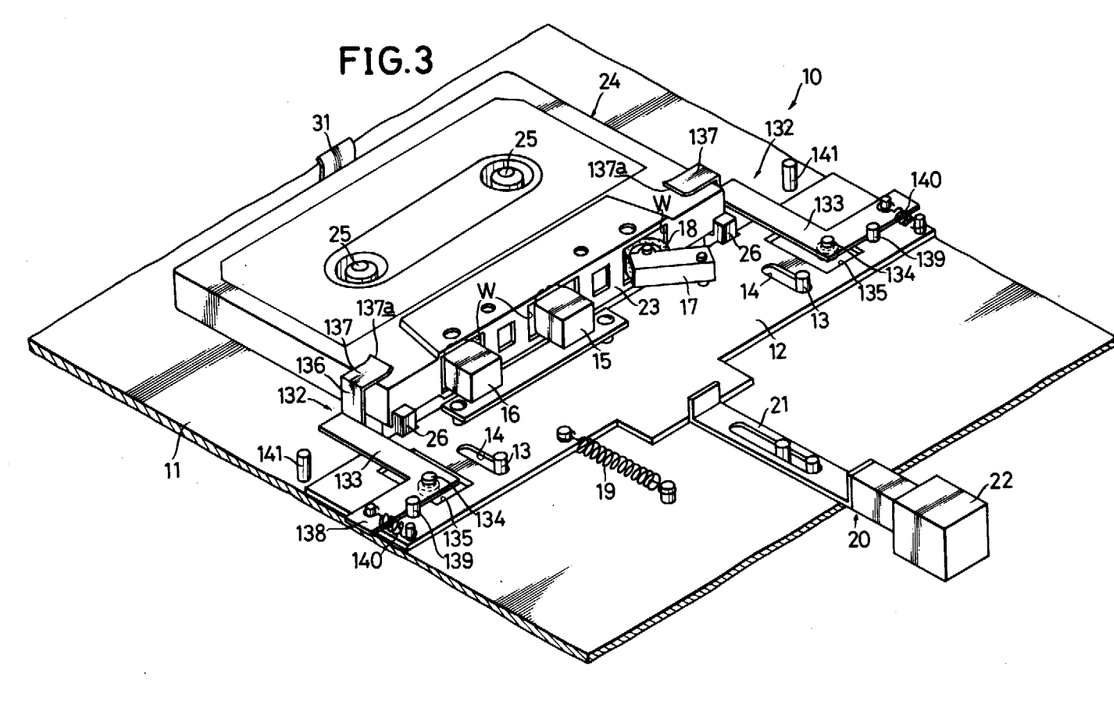
FIG. 3 is a perspective view similar to that of FIG. 1, but showing a cassette holding device according to an embodiment of this invention for accurately locating a tape cassette in respect to the head or heads by which signal recording and/or reproducing operations are performed.
Figure 4:
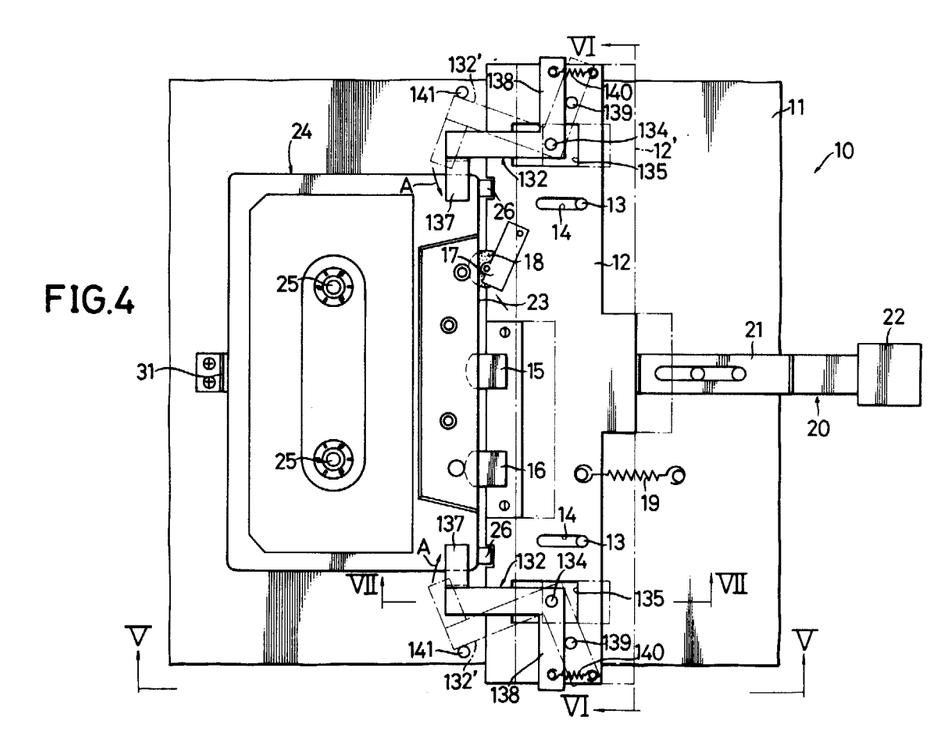
FIG. 4 is a top plan view of the portion of a cassette tape recording and/or reproducing apparatus shown on FIG. 3, and with the cassette holding device of this invention being shown in broken lines in its cassette releasing position.

More specifically, and with reference to FIGS. 3–7 in which a cassette tape recording and/or reproducing apparatus 10 in accordance with this invention has its several elements corresponding to those described above in connection with the prior art apparatus of FIGS. 1 and 2 identified by the same reference numerals, it will be seen that the cassette holding means according to the embodiment of this invention there illustrated includes a pair of cassette holding devices 132 pivotally mounted on chassis 11 for movement in respect to the latter between cassette holding positions shown on FIG. 3 and in full lines on FIG. 4, and cassette releasing positions indicated in broken lines on FIG. 4 at 132'. Each of cassette holding devices 132 is shown to include an arm 133 pivotally mounted, for swinging in a horizontal plane above carriage 12, on a pivot pin 134 which is suitably secured to chassis 11 and which projects upwardly through an aperture 135 in carriage 12 so as not to interfere with movements of the latter between its active and inactive positions. Each pivot pin or stud 134 is laterally located so that, with the arm 133 extending generally rearwardly therefrom, such arm will be disposed laterally outside the respective side of cassette 24 when the latter is operatively positioned on support blocks 26 and pin 27. The rear or free end portion of arm 133 is shown to have an extension 136 directed upwardly therefrom and terminating in a laterally inward directed holding member 137 having an upwardly bent or turned free end edge 137a.

In the embodiment of the invention being described, the actuating means for each cassette holding device 132 includes an arm 138 which is angularly fixed relative to the respective arm 133, for example, by being formed integral therewith, so as to extend laterally outward from pivot pin 134, an actuating pin 139 fixed on carriage 12 so as to act rearwardly against actuating arm 138 upon movement of carriage 12 from its inactive position to its active position, and a spring 140 connected between actuating arm 138 and carriage 12 for urging actuating arm 138 to swing in the forward direction, that is, into contact with the respective actuating pin 139. A stop or pin 141 extends upwardly from chassis 11 laterally outside of arm 133 for limiting the swinging of the latter in the direction laterally away from the adjacent side of cassette 24 and thereby defining the cassette releasing position of the respective holding device 132.

It will be apparent that, with the arrangement described above, forward movement of the head carriage to its inactive position indicated in broken lines at 12' on FIG. 4 will be effective, through each spring 140, to swing the respective actuating arm 138 forwardly from the position shown in full lines to the position shown in broken lines, with the result that the respective arm 133 will be swung laterally outward against stop 141 for disposing each holding device in its cassette releasing position indicated in broken lines at 132'. In such cassette releasing position, the holding member 137 of each device 132' is swung laterally outward away from the adjacent side of the operatively positioned cassette 24, whereby to avoid interference with the movement of the cassette to and from its operative position on support blocks 26 and pin 27. However, when carriage 12 is moved rearwardly to its active position shown in full lines on FIG. 4, each pin 139 on carriage 12 moves rearwardly against the respective actuating arm 138 so that the associated arm 133 is swung laterally inward toward the adjacent side of cassette 24. During such laterally inward swinging of each arm 133, that is, during movement of the respective holding device 132 to its cassette holding position shown in full lines on FIG. 4, the respective holding member 137 moves onto, and bears downwardly against the upper surface of cassette 24 adjacent the corner of the latter which is seated on the surface 28 of a support block 26. In the embodiment of the invention shown on FIGS. 3–7, each cassette holding device 132 and its respective actuating arm 138 is formed integrally of spring steel or other resilient material, and each device 132 is further dimensioned so that the holding member 137 thereof, in moving onto the upper surface of cassette 24, will exert a resilient downward force thereagainst. Thus, in the cassette holding positions of devices 132, the forward edge portion of cassette 24 is again securely held against surfaces 28 of support blocks 26. However, since cassette holding devices 132 are pivotally mounted on chassis 11, rather than on carriage 12, the downwardly exerted resilient forces applied by holding members 137 to cassette 24 have reactions transmitted through pivots 134 to chassis 11, and such reactions do not tend to lift carriage 12 and head 15 relative to chassis 11, or relative to the cassette 24 which is securely positioned relative to the chassis. Accordingly, the cassette holding devices 132 are effective to precisely and reliably maintain the desired relationship of the level of recording and reproducing head 15, in the active position of carriage 12, in respect to the tape within the operatively positioned cassette.

Further, as shown on FIG. 4, during the movement of devices 132 from their cassette releasing positions to their cassette holding positions, the holding members 137 thereof move frictionally over the upper surface of cassette 24 along respective paths A having forwardly directed components. Thus, such movements of holding members 137 in frictional engagement with the upper surface of cassette 24 cooperate with resilient member 31 in urging cassette 24 forwardly against the upstanding surfaces 29 of support blocks 26. Accordingly, when holding devices 132 are in their cassette holding positions, the forward edge wall of cassette 24 is reliably engaged against surfaces 29 for precisely and reliably providing the desired contact pressure of recording and reproducing head 15 with the tape in the operatively positioned cassette.

Figure 5:
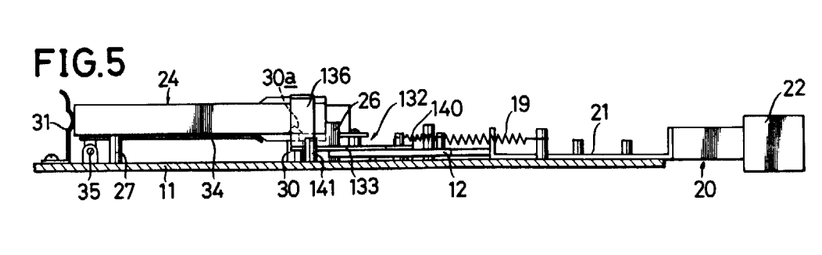
FIGS. 5 and 6 are sectional views taken along the lines V—V and VI—VI, respectively, on FIG. 4.
Figure 6:
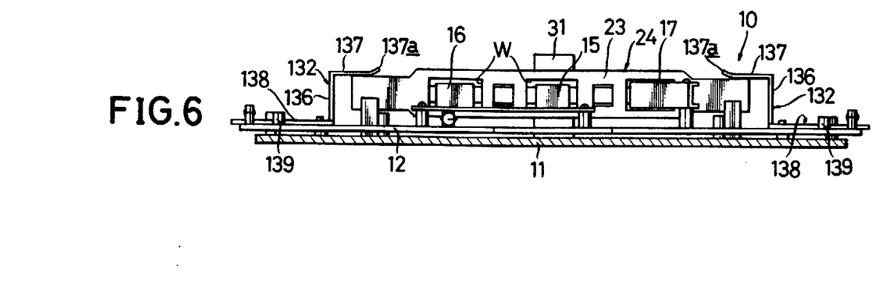
Figure 7:
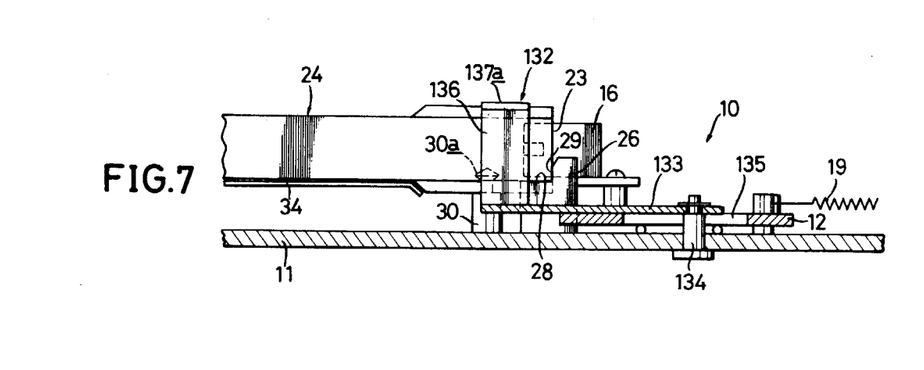
FIG. 7 is an enlarged fragmentary sectional view taken along the line VII—VII on FIG. 4, and showing details of the mounting of one of the cassette holding members of the device according to this invention.

It will also be appreciated that, if the ejecting mechanism is actuated while carriage 12 is in its active position, the upward swinging of platform 34 and of cassette 24 from the positions shown on FIGS. 5 and 7 will be prevented by the engagement of cassette holding devices 132 with the cassette. However, since cassette holding devices 132 are movably mounted on chassis 11, the reactions to the forces resisting upward swinging of cassette 24 will be transmitted to chassis 11, and not to carriage 12 so as to avoid enlargement of the vertical play originally provided in the slidable mounting of the carriage on the chassis.

Figure 8:
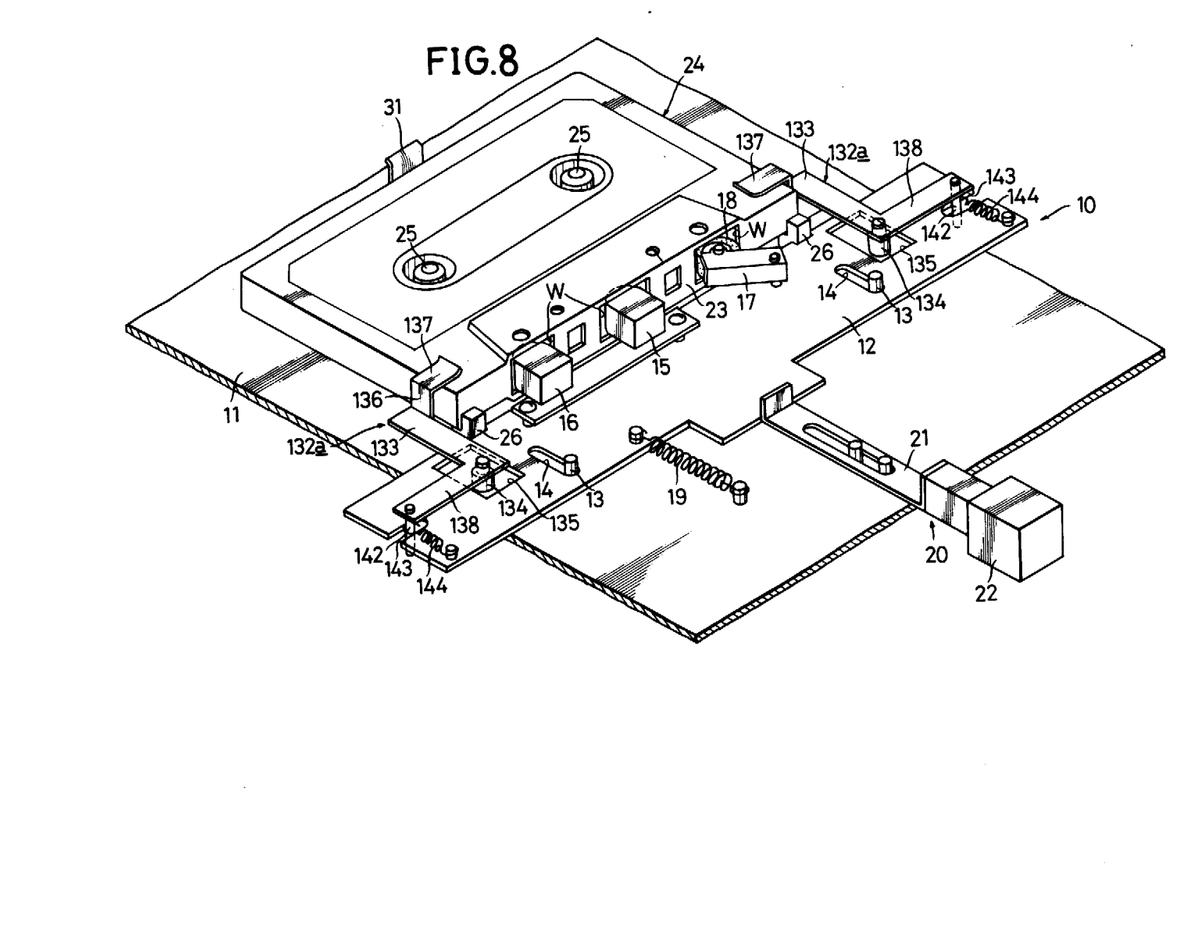
FIGS. 8, 9 and 10 are perspective views similar to that of FIG. 3, but showing other respective embodiments of this invention.

Referring now to FIG. 8, in which the elements of the apparatus 10 corresponding to those described above with reference to FIGS. 1 and 2 are again identified by the same reference numerals, it will be seen that the cassette holding devices 132a in accordance with the embodiment of the invention illustrated on FIG. 8 are generally similar to the previously described devices 132 and differ from the latter only in respect to the actuating means provided for effecting movements of devices 132a between their cassette holding and releasing positions in response to movements of carriage 12 between its active and inactive positions, respectively. More specifically, the actuating means for each of the cassette holding devices 132a is shown to include a pin 142 depending from the free end portion of the respective actuating arm 138 and being slidably received in a respective laterally directed slot 143 formed in an adjacent end portion of carriage 12. If desired, as shown, a spring 144 may be connected between pin 142 and a suitable anchor on carriage 12 for taking up any play between pin 142 and the slot 143 which slidably receives the latter. It will be apparent that movement of carriage 12 between its inactive and active positions will again cause turning of cassette holding devices 132a about the respective pivots 134 on chassis 11 for moving such cassette holding devices between their cassette releasing and holding positions, respectively.

Figure 9:
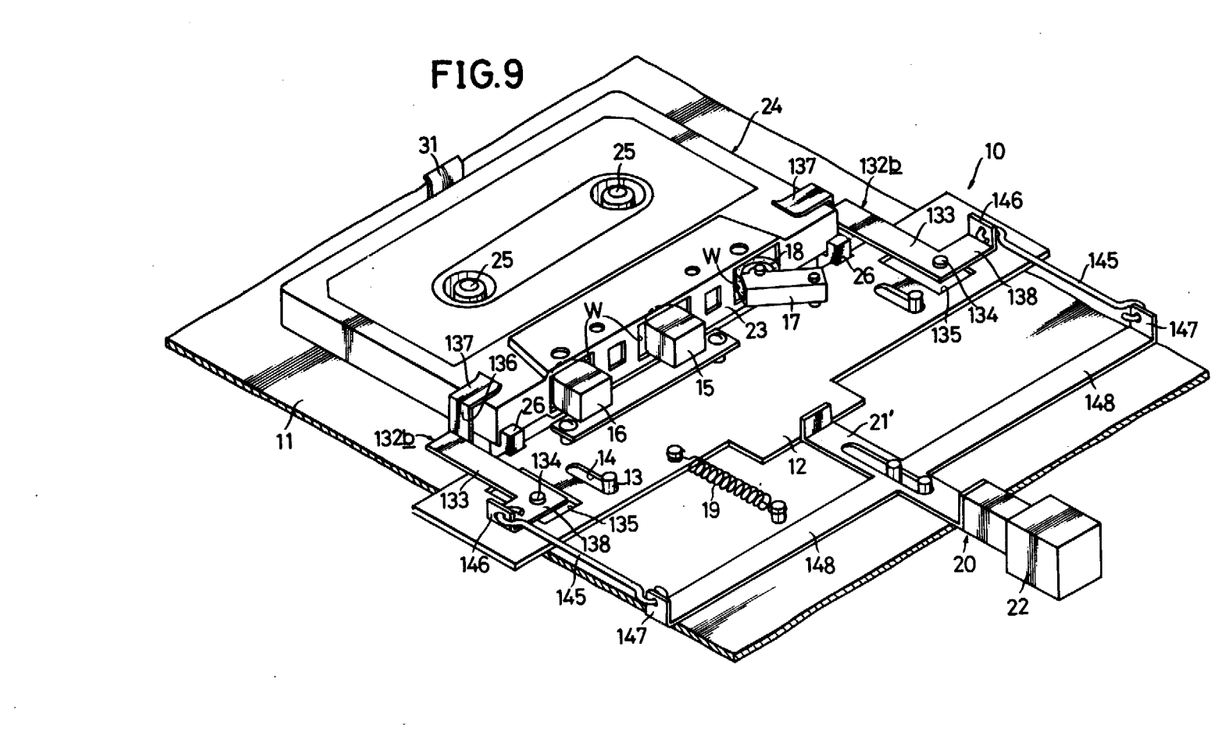

In each of the previously described embodiments of this invention, the actuating means for effecting movement of each cassette holding device 132 or 132a to its cassette holding and releasing positions upon movement of carriage 12 to its active and inactive positions, respectively, included cooperatively engageable elements on carriage 12 and on each cassette holding device. However, as shown on FIG. 9 in which elements corresponding to those previously described are identified by the same reference numerals, the actuating means for cassette holding devices 132b according to another embodiment of this invention may include links or rods 145 pivotally connected, at one end, to lugs 146 formed on the outer ends of actuating arms 138, and, at their other ends, to lugs 147 formed at the ends of rigid arms 148 which extend laterally outward from the opposite sides of the link 21' of control mechanism 20. Thus, when link 21' is moved rearwardly in response to the manual actuation or depression of control push-button 22 for selecting the recording or reproducing mode of operation of apparatus 10, and hence for displacing carriage 12 to its active position, the similar movements of arms 148 are transmitted through links 145 to the respective actuating arms 138 for turning devices 132b to their cassette holding positions. On the other hand, when push-button 22 of control mechanism 20 is released to permit spring 19 to return carriage 12 to its inactive position, the corresponding return movement of link 21' is transmitted through arms 148 and links 145 to actuating arms 138 for displacing or pivotally moving the respective devices 132b to their cassette releasing positions.

Figure 11:
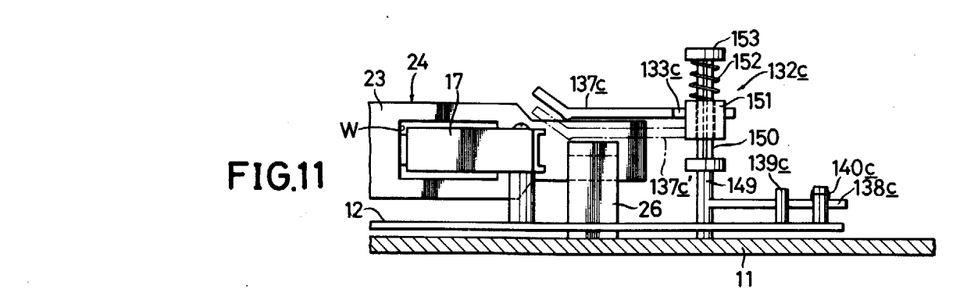
FIGS. 11 and 12 are enlarged, fragmentary sectional views each generally corresponding to the right-hand end portion of FIG. 6, but showing respective modifications of the cassette holding members.

In each of the previously described embodiments of this invention, each cassette holding device 132,132a or 132b has been shown to be of one-piece construction and formed of spring steel or other resilient material for providing the desired downwardly directed resilient force of the holding member 137 against the operatively positioned cassette 24 when the device 132,132a or 132b is in its cassette holding position. However, as shown on FIG. 11, a cassette holding device 132c according to this invention may include a hub 149 which is turnable about a vertical axis on a pivot (not shown) secured to chassis 11 and which has an actuating arm 138c extending laterally outward therefrom similarly to the actuating arm 138 on FIGS. 3 and 4 for cooperation with an actuating pin 139c on carriage 12. A splined extension 150 extends upwardly from turnable hub 149 and has a similarly splined bushing 151 axially slidable thereon but rotatably coupled to splined extension 150 and hub 149. An arm 133c integral with bushing 151 extends rearwardly from the latter and terminates in an inwardly directed holding member 137c which corresponds to the holding member 137 in each of the previously described embodiments. Finally, a compression spring 152 is provided on splined extension 150 between a head 153 at the top of the latter and bushing 151 for urging the latter downwardly and thereby tending to dispose holding member 137c at the position indicated in broken lines at 137'c. Thus, when device 132c is in its cassette holding position, as shown on FIG. 11, spring 152 causes holding member 137c to bear downwardly on the upper surface of operatively positioned cassette 24 for holding the latter securely against the upwardly facing surface on the adjacent support block 26. However, when carriage 12 is moved to its inactive position, the spring 140c connected between carriage 12 and actuating arm 138c turns device 132c about the vertical axis of hub 149 so as to displace holding member 137c laterally away from the adjacent side of cassette 24.

Figure 12:
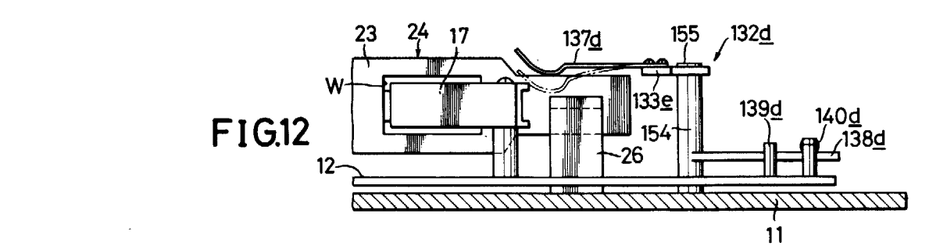

Another modification of the cassette holding devices 132 of FIGS. 3–7 is shown on FIG. 12 in which the illustrated cassette holding device 132d includes a sleeve 154 turnable about a vertical pivot or pin 155 extending from chassis 11. An actuating arm 138d extends laterally outward from the lower end portion of sleeve 154 for engagement by an actuating pin 139d on carriage 12 and for connection to carriage 12 by way of a spring 140d similar to the spring 140 on FIG. 3. A rigid arm 133d extends rearwardly from the upper end portion of sleeve 154, and a holding member 137d of spring steel or other resilient material is secured to the rear end of arm 133d and extends laterally inward therefrom so as to bear downwardly on the upper surface of cassette 24 when the respective cassette holding device 132d is in its cassette holding position, as shown. Thus, in the embodiment of FIG. 12, arms 133d and 138d may be formed of rigid material integrally with sleeve 154, while only the holding member 137d is formed of spring steel or other resilient material.

Figure 10:
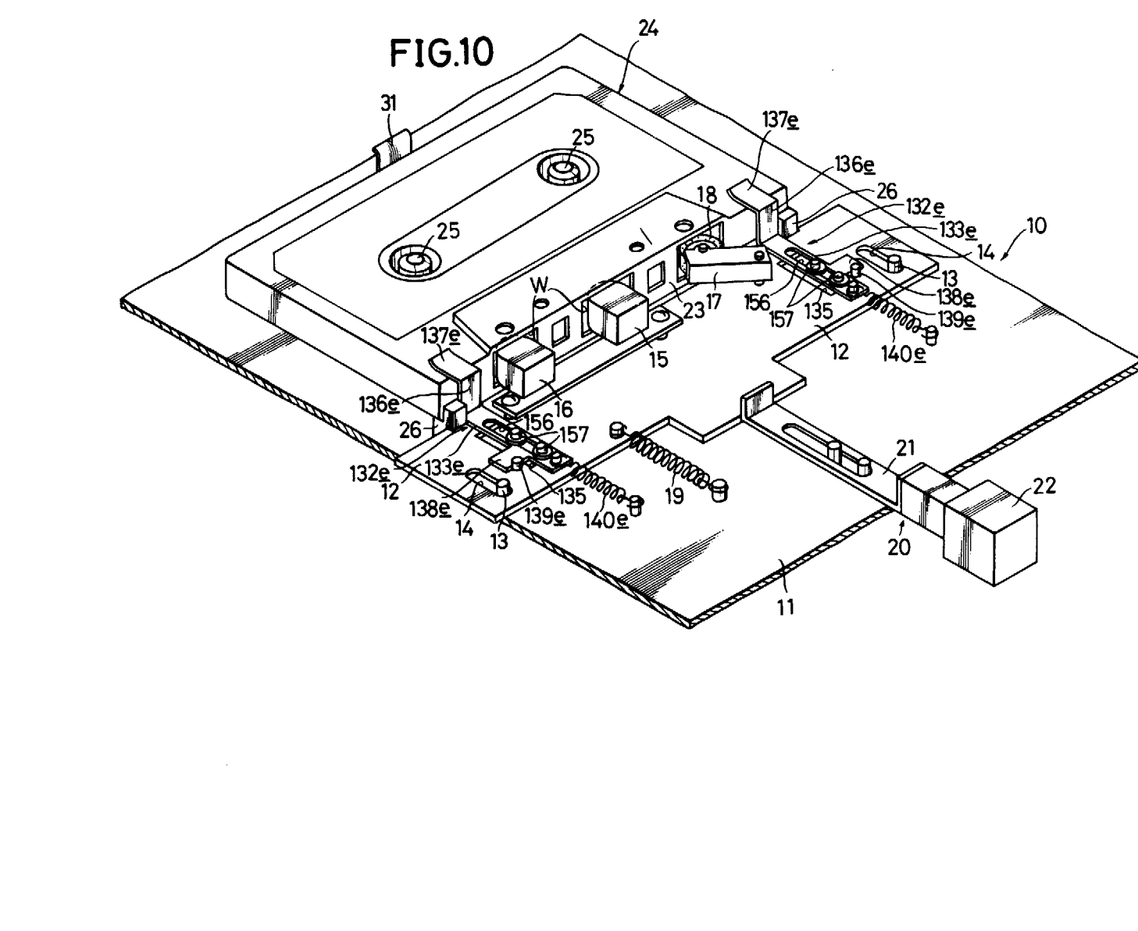

In all of the previously described embodiments of this invention, each of the cassette holding devices 132, 132a, 132b,132c or 132d has been mounted pivotally on the chassis 11 for swinging movement relative to the latter between the cassette holding and releasing positions. However, as shown on FIG. 10, in which the elements of apparatus 10 corresponding to those previously described are again identified by the same reference numerals, cassette holding devices 132e in accordance with this invention may be mounted on chassis 11 for rectilinear movement relative to the latter between the cassette holding and releasing positions of such devices. More specifically, as shown, each of the cassette holding devices 132e may include an elongated slide member 133e having an elongated slot 156 which slidably receives guide pins 157 extending upwardly from chassis 11 through a respective aperture 135 in carriage 12. Thus, slide member 133e is mounted on chassis 11 for longitudinal movement of the slide member parallel to the directions of movement of carriage 12 between its active and inactive positions. An extension 136e is directed upwardly from the rear end of slide member 133 and terminates in a rearwardly directed holding member 137e. An actuating arm 138e is directed laterally outward from slide member 133e so as to be engageable by an actuating pin 139e fixed on carriage 12, and a spring 140e is connected between the forward end of slide member 133e and a suitable anchor on chassis 11 for urging slide member 133e in the forward direction and thereby maintaining contact of actuating arm 138e with pin 139e. It will be apparent that, when carriage 12 is in its active position, as shown on FIG. 10, the holding member 137e of each device 132e extends onto, and bears downwardly against the upper surface of cassette 24 adjacent the portion of the latter seated on a respective support block 26. Since holding device 132e is again movably mounted on chassis 11, rather than on carriage 12, the resilient downward bearing of each holding member 137e on cassette 24 does not produce an upwardly directed reaction on carriage 12, and thus does not disturb the maintenance of the desired level of recording and reproducing head 15 relative to the tape within the operatively positioned cassette 24. When carriage 12 is moved forwardly to its inactive position, each pin 139e thereon moves forwardly away from the respective actuating arm 138e, so that each spring 140e is then effective to displace the respective holding device 132e forwardly to its cassette releasing position in which the holding member 137e is forwardly spaced from cassette 24.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, as defined in the appended claims.

What is claimed is:

1. A cassette tape recording and/or reproducing apparatus comprising: a chassis; a carriage having at least one head thereon; means mounting said carriage on said chassis for movement of said carriage relative to the latter parallel to the chassis between an inactive position, in which said head is spaced from a tape cassette in an operative position, and an active positive, in which said head is engaged through a first edge portion of a cassette in said operative position with the tape in said casette; supporting means fixed on said chassis for supporting and locating a tape cassette in said operative position on said chassis, said supporting means includes a pair of support members fixed on said chassis and having shouldered portions each defining a first surface facing away from said chassis for engaging the undersurface of the tape cassette near said first edge portion of the latter which is adjacent said head in said active position of the carriage so as to hold the tape in the cassette at a predetermined level in respect to said head when the latter engages the tape and a second surface normal to said first surface for engagement by said first edge portion of the cassette so as to establish the engaging pressure of said head, in said active position of the carriage, against the tape in the cassette in said operative position of the latter; resilient means acting against the edge portion of the cassette which is opposite said first edge portion in said operative position of the cassette for urging said first edge portion against said second surface of each said shouldered portion of the supporting means; a pair of holding members movably mounted on said chassis for movement in respect to the latter between respective cassette holding positions, in which said holding members engage a tape cassette in said operative position from above adjacent said first edge portion of the cassette for securely holding the tape cassette in engagement with each said first surface of the supporting means, and respective cassette releasing positions, in which said holding members are spaced from a tape cassette in said operative position, each of said holding members, in moving from said cassette releasing position to said cassette holding position, moving over the upper surface of a cassette along a path having a component directed toward said first edge portion of the cassette in said operative position so as to also urge said first edge portion against said second surface of each of said shouldered portions of the supporting means; and actuating means for moving said holding members to said cassette holding and releasing positions upon movement of said carriage to said active and inactive positions, respectively.

2. A cassette tape recording and/or reproducing apparatus according to claim 1; in which each of said holding members extends inwardly toward a respective side portion of the cassette from an end portion of a respective arm which is pivoted on said chassis for swinging of said arm toward and away from said respective side portion of the cassette in said operative position of the latter.

3. A cassette tape recording and/or reproducing apparatus according to claim 2; in which each of said holding members is integral with the respective pivoted arm and formed of a resilient material for yieldably urging the cassette downwardly against said first surface of each of said shouldered portions of the supporting means in said cassette holding position of the holding members.

4. A cassette tape recording and/or reproducing apparatus according to claim 2; in which each of said holding members is of a resilient material and the respective pivoted arm is relatively rigid so that, in said cassette holding position of said holding members, said holding members yieldably urge the cassette downwardly against said first surface of each of said shouldered portions of the supporting means.

5. A cassette tape recording and/or reproducing apparatus according to claim 2; in which said pivoted arm associated with each of said holding members is axially displaceable, and spring means acts downwardly on each said pivoted arm so that, in said cassette holding position of said holding members, said holding members yieldably urge the cassette downwardly against said first surface of each of said shouldered portions of the supporting means.

6. A cassette tape recording and/or reproducing apparatus according to claim 2; in which said actuating means includes spring means urging each said pivoted arm in the direction away from said respective side portion of the cassette, and cooperatively engageable means on each said pivoted arm and said carriage for swinging said arm toward said respective side portion of the cassette in response to movement of the carriage to said active position.

7. A cassette tape recording and/or reproducing apparatus according to claim 2; further comprising a control mechanism for selectively moving said carriage to said active and inactive positions; and in which said actuating means includes link means connecting each said pivoted arm with said control mechanism.

* * * * *